(12) United States Patent
Lin

(10) Patent No.: US 7,502,335 B2
(45) Date of Patent: Mar. 10, 2009

(54) METHOD FOR ALLOCATING IP ADDRESSES FOR PEER-TO-PEER WIRELESS INSTANT MESSAGING AND OTHER DATA COMMUNICATIONS

(75) Inventor: Daniel J. Lin, San Francisco, CA (US)

(73) Assignee: Daniel Lin, San Francisco, CA (US)

( * ) Notice: Subject to any disclaimer, the term of this patent is extended or adjusted under 35 U.S.C. 154(b) by 338 days.

(21) Appl. No.: 11/182,927

(22) Filed: Jul. 15, 2005

(65) Prior Publication Data

US 2005/0249134 A1    Nov. 10, 2005

Related U.S. Application Data

(63) Continuation-in-part of application No. 11/042,620, filed on Jan. 24, 2005, which is a continuation-in-part of application No. 10/935,342, filed on Sep. 7, 2004, which is a continuation-in-part of application No. 10/817,994, filed on Apr. 5, 2004.

(51) Int. Cl.
*H04Q 7/00* (2006.01)

(52) U.S. Cl. .................... 370/278; 370/329; 455/466

(58) Field of Classification Search ............... 370/278, 370/313, 329; 455/466
See application file for complete search history.

(56) References Cited

U.S. PATENT DOCUMENTS 4,582,956 A    4/1986    Doughty

| 2002/0155826 | A1 | 10/2002 | Robinson et al. |
| 2002/0165000 | A1 | 11/2002 | Fok |
| 2003/0126213 | A1 | 7/2003 | Betzler |
| 2005/0021645 | A1 | 1/2005 | Kulkarni et al. |
| 2005/0058094 | A1 | 3/2005 | Lazaridis et al. |

FOREIGN PATENT DOCUMENTS

| EP | 1 331 786 A1 | 7/2003 |
| EP | 1331786 A1 * | 7/2003 |
| EP | 1 361 765 A | 11/2003 |
| WO | WO 01/41477 A1 | 6/2001 |
| WO | WO 01/69406 A | 9/2001 |
| WO | WO 03/087972 A2 | 10/2003 |
| WO | WO 2004/073288 A | 8/2004 |

OTHER PUBLICATIONS

Newton, Harry, "Newton's Telecom Dictionary", Mar. 2003, CMP Books, 19th Edition, p. 534, definition of "NAT."*
U.S. Appl. No. 60/503,366, filed Sep. 16, 2003, Klassen.
U.S. Appl. No. 60/503,367, filed Sep. 16, 2003, Lazaridis.

* cited by examiner

*Primary Examiner*—CongVan Tran
(74) *Attorney, Agent, or Firm*—Patterson & Sheridan, L.L.P

(57) ABSTRACT

A technique is provided for allocating publicly accessible IP addresses to an initiating mobile device to establish peer-to-peer session-based instant messaging with a target mobile device residing on a separate network without the need for using an instant messaging registration or log-in server to provide presence information. Session-based instant messaging communications between mobile devices are established by transmitting necessary address information through page-based messaging services that utilize the underlying digital mobile network databases and services to resolve the identification and location of the mobile devices.

10 Claims, 4 Drawing Sheets

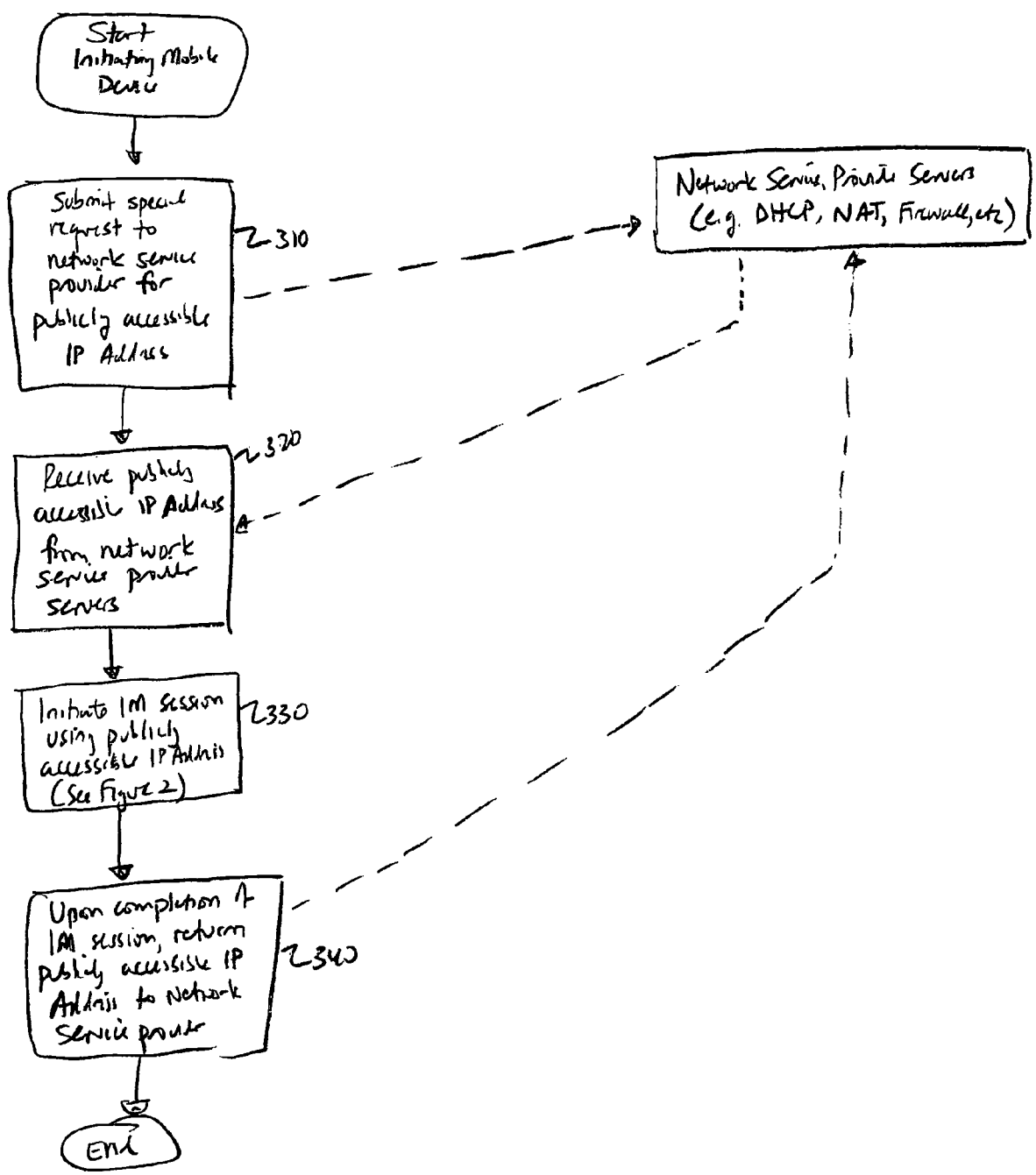

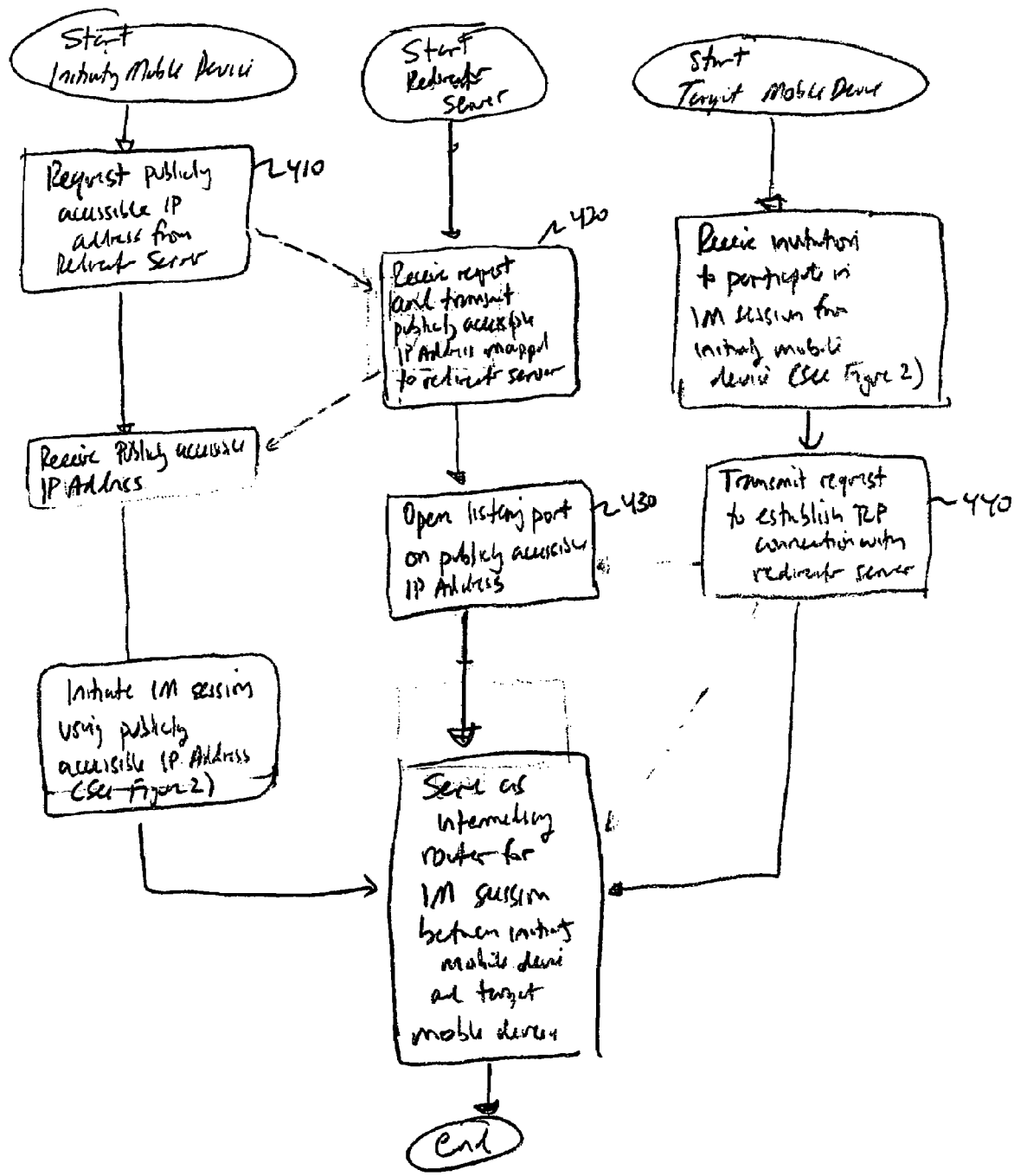

US 7,502,335 B2

METHOD FOR ALLOCATING IP ADDRESSES FOR PEER-TO-PEER WIRELESS INSTANT MESSAGING AND OTHER DATA COMMUNICATIONS

CROSS REFERENCE TO RELATED APPLICATIONS

This application is a continuation-in-part of U.S. Ser. No. 11/042,620, filed Jan. 24, 2005 which is a continuation-in-part of U.S. Ser. No. 10/935,342, filed Sep. 7, 2004 which is a continuation-in-part of U.S. Ser. No. 10/817,994, filed Apr. 5, 2004, all of which are hereby incorporated by reference.

FIELD OF THE INVENTION

The present invention relates generally to messaging techniques for mobile devices, and more specifically, a technique to allocate publicly accessible network addresses to establish peer-to-peer session-based instant messaging ("IM") communications or other data communications among mobile devices.

BACKGROUND OF THE INVENTION

Current instant messaging ("IM") technologies depend upon a registration system to enable end users to communicate with one another. For example, to establish an IM session on AOL's Instant Messenger ("AIM"), each participating end user must have registered with AOL and must log into an AIM server in order to use the service. This registration system creates a virtual network of registered users and the value to a new user in joining an IM service is directly related to the number of existing users already registered on the service. As more users register to use an IM service, the value of the IM service to registered users increases since registered users will be able establish IM sessions with an increasing number of users. Known as a "network effect," this phenomenon causes a further tipping effect, which is the natural tendency for few (or even a single) IM services to pull away from their competitors once they have gained an initial edge by registering a critical mass of users. This tipping effect tends to occur rapidly and stems, in part, from users' inclination to gravitate towards the IM services that they expect will be become dominant. This tipping effect gives proprietary IM services such as AIM, Microsoft's .NET Messenger Service, and Yahoo! Messenger, that have achieved a large network of registered users, a strong barrier to entry into the IM market. As such, proprietary IM services may be reluctant to provide interoperability to other less established IM services since providing such access could cannibalize their competitive network advantage.

From a technical perspective, the registration system used in IM services is necessary to provide presence capabilities. In order to establish an IM session, an end user must be registered with the IM service so that the end user can log into the service's IM server, which broadcasts the end user's availability to engage in IM sessions to an authorized group of the end user's peers that have also registered and logged into the IM server. The IM server also similarly provides the end user with a list of registered peers that are available to engage in an IM session. When end users engage in IM sessions over a traditional connected network environment, presence capabilities are a critical characteristic of an IM service because such capabilities are needed to provide an end user's peers with sufficient presence information (i.e., IP address and port number) in order to locate the end user within the network and establish a connection between the end user and a peer for an IM session. Furthermore, logging into an IM server also enables an end user to indicate whether or not he or she is physically present (e.g., sitting in front of a networked workstation or in front of a laptop that is connected the network) and willing to engage in an IM session.

However, IM services for mobile devices, such as smartphones, appear to have less a need for presence capabilities. Unlike establishing an IM session on a laptop, desktop or workstation, where the end user must broadcast his or her availability and presence information on the network when he or she is physically sitting in front of the laptop, desktop or workstation, establishing an IM session on a mobile device does not suffer from the same presence issues because the end user is presumed to be carrying the mobile device at all times. So long as the mobile device has enough contact information (e.g., cellular telephone number, PIN number, etc.) to directly communicate with other mobile devices through the underlying wireless network technology (e.g., cellular technology, etc.), an IM session could be initiated and established in a manner similar to making and answering mobile phone calls without the need for registering with or logging into an IM server in order to broadcast presence information to other end users for IM purposes.

Furthermore, unlike IM services in a traditional connected network environment, successful end user adoption of an IM service between mobile devices would not suffer from reliance upon establishing a critical mass of end users through a registration system. In contrast, such an IM service would be instantly usable to any and all end users of mobile devices so long as such mobile devices are already capable of directly communicating with other mobile devices through the underlying wireless mobile technology without needing further presence information (e.g., cellular phones directly communicating with other cellular phones through cellular telephone numbers). As such, what is needed is a method to establish IM sessions directly between mobile devices, where such mobile devices are capable of directly communicating with other mobile devices through the underlying wireless technology, such that no IM registration or log-in server is needed to provide presence information to other mobile devices for IM purposes.

SUMMARY OF THE INVENTION

The present invention provides a method for allocating publicly accessible IP addresses to mobile devices in order to facilitate IM sessions between mobile devices on different networks. From the perspective of a service provider, an IP address allocation server receives a request from an initiating mobile device for a publicly accessible IP address to facilitate an IM session with a target mobile device residing on the network of a different service provider. The IP address allocation server allocates such a publicly accessible IP address to the initiating mobile device which, in turn, uses that IP address to initiate an IM session as described herein. Upon completion of such an IM session, the IP address allocation server receives notification that initiating mobile device has finished with the publicly accessible IP address.

DETAILED DESCRIPTION OF THE INVENTION

Figure 1:
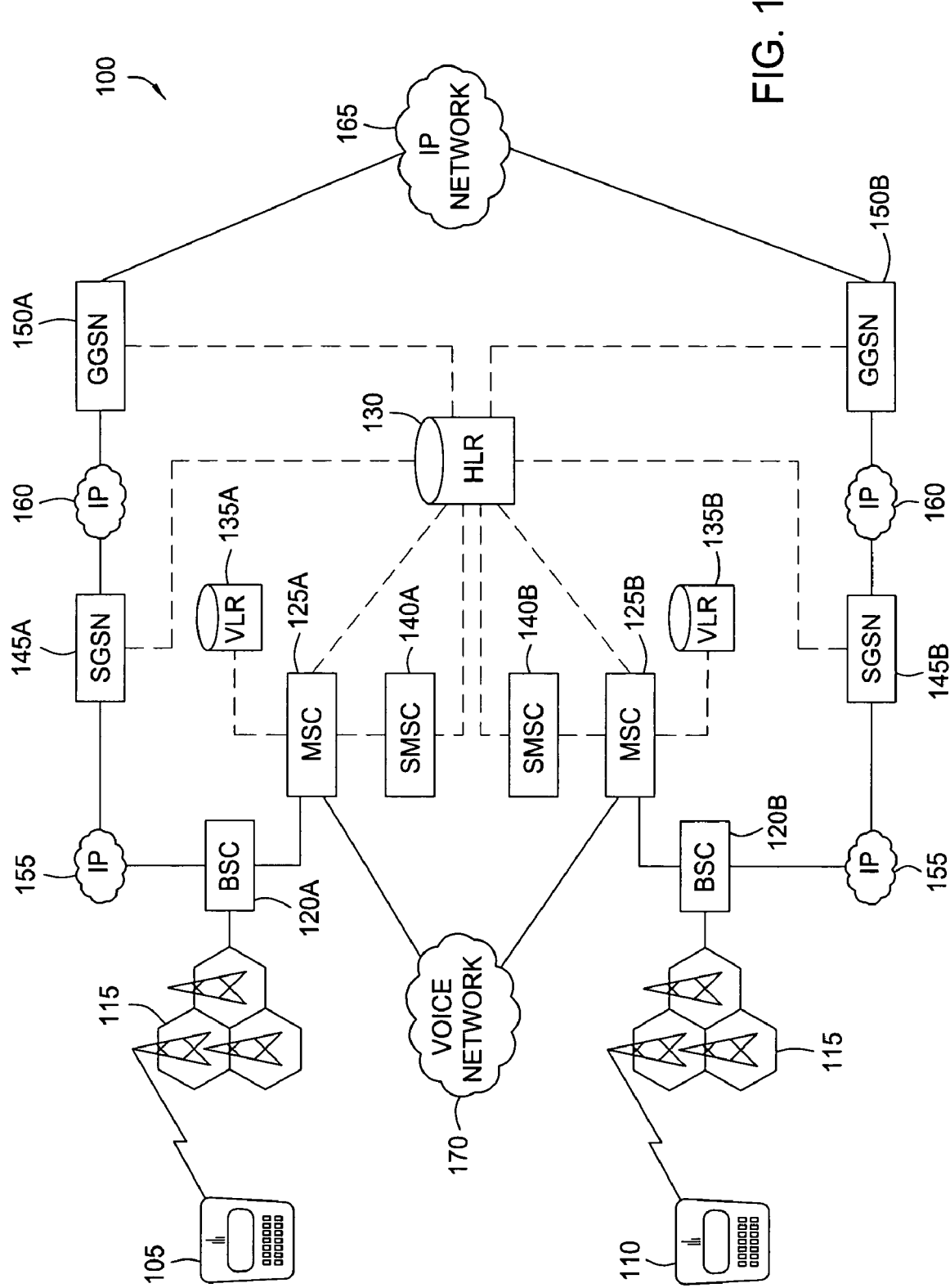
FIG. 1 depicts a diagram of an environment for establishing an IM session in accordance with the present invention between a first mobile device and a second mobile device in a GSM mobile network system supporting GPRS as a data packet-based communications service, SMS as a text messaging service, and TCP/IP as an underlying data packet based network protocol.

FIG. 1 depicts one environment to deploy an embodiment of the present invention. As depicted, the underlying digital mobile network system in this environment is the Global System for Mobile communications (GSM) 100 standard. Under the GSM standard, each of the mobile devices 105 and 110 includes a Subscriber Information Module (SIM) card that contains unique identification information that enables the GSM system to locate the mobile devices within the network and route data to them. A current commercial example of a mobile device (e.g., smartphone, PDA, handheld, etc.) that might be used in FIG. 1 could be Research In Motion's (RIM) BlackBerry handheld devices, which includes a QWERTY keyboard to facilitate the typing of text. As depicted, a GSM architecture includes the following components: base transceiver stations (BTS) 115 and base station controllers (BSC) (120A or 120B) for managing the transmission of radio signals between the MSC (defined below) and the mobile devices, mobile service-switching centers (MSC) (125A and 125B) for performing the all switching functions and controlling calls to and from other telephone and data systems, a home location register (HLR) 130 for containing all the administrative, routing and location information of each subscriber registered in the network, visitor location registers (VLR) (135A and 135B) for containing selected administrative information about subscribers registered in one HLR who are roaming in a another HLR, and an equipment identity register (EIR) (not shown) for containing a list of all valid mobile equipment on the network). As depicted in FIG. 1, in one architecture of a GSM network, there may be exist one HLR while there may exist multiple MSCs (each with a related VLR) which each serves a different geographic area. The MSCs also provide the interface for the GSM network to more traditional voice networks 170 such as the PSTN. This underlying GSM architecture provides radio resources management (e.g., access, paging and handover procedures, etc.), mobility management (e.g., location updating, authentication and security, etc.), and communication management (e.g., call routing, etc.) in order to enable mobile devices in the GSM network to send and receive data through a variety of services, including the Short Message Service (SMS), an asynchronous bi-directional text messaging service for short alphanumeric messages (up to 160 bytes) that are transported from one mobile device to another mobile device in a store-and-forward fashion.

A GSM network within which the present invention may be deployed would also support a page-mode messaging service, such as SMS, that relies upon the underlying GSM mechanisms to resolve routing information in order to locate destination mobile devices. Page-mode messaging services such as SMS transmit messages that are independent or asynchronous with each other, but there is no formal relationship between one message and another. In contrast, an IM session that is implemented in accordance with the present invention is a session-mode or session-based messaging service where exchanged messages are formally associated in a session thereby minimizing the overhead costs of transmitting independent messages. A GSM network supporting SMS text messaging may further include the following SMS specific components: a short message service center (SMSC) (140A or 140B) for storing and forwarding messages to and from one mobile device to another, an SMS Gateway-MSC (SMS GMSC) for receiving the short message from the SMSC (140A or 140B) and interrogating the destination mobile device's HLR 130 for routing information to determine the current location of the destination device to deliver the short message to the appropriate MSC (125A or 125B). The SMS GMSC is typically integrated with the SMSC 140. In a typical transmission of an SMS text message from an originating mobile device 105 to a receiving mobile device 110, (i) the text message is transmitted from the mobile 105 to the MSC 125A, (ii) the MSC 125A interrogates its VLR 135A to verify that the message transfer does not violate any supplementary services or restrictions, (iii) the MSC 125A sends the text message to the SMSC 140A, (iv) the SMSC 140A, through the SMS GMSC, interrogates the receiving mobile device's HLR 130 (by accessing the SS7 network) to receive routing information for the receiving mobile device 110, (v) the SMSC sends the text message to the MSC 125B servicing receiving mobile device 110, (vi) the MSC 125B retrieves subscriber information from the VLR 135B, and (vii) the MSC 125A transmits the text message to the receiving mobile device 110. Similar to other transactions on the GSM network, SMS text messaging utilizes telephone numbers as identifying addresses for mobile devices and as such, utilizes the SS7 network signaling system through which cellular service providers share information from the HLR with other service providers. As depicted in FIG. 1, SS7 based signaling communication is represented by the broken lines. In contrast, the solid lines in FIG. 1 represent data or voice based communications.

In addition to a page-mode messaging service such as SMS, a GSM network within which the present invention may be deployed would also support a data packet based communications service, such as the General Packet Radio Service (GPRS), that enables TCP/IP transmission protocol based communications between mobile devices within the network. As depicted in FIG. 1, a core GPRS network exists in parallel to the existing GSM core network. The BSC 120 may direct voice traffic through the MSC (125A or 125B) to the GSM network and data traffic through the Serving GPRS Support Note (SGSN) (145A or 145B) to the GPRS network. Such communication between the BSC (125A or 125B) and the SGSN (145A or 145B) may be, for example, based upon the IP network protocol communication 155. As such, GPRS signaling and data traffic do not flow through the core GSM network. Instead, the core GSM network is used by GPRS only for table look-up in the HLR 130 and VLR (135A or 135B) to obtain routing, location and other subscriber information in order to handle user mobility. The SGSN (145A or 145B) serves as a "packet-switched MSC," delivering data packets to mobile devices in its service area. The Gateway GPRS Support Note (GGSN) (150A or 150B) communicates with the SGSN (145A or 145B) through an IP based GPRS backbone 160 and serves as an interface to other external IP networks 165 such as the Internet and other mobile service providers' GPRS services.

When an IM service is offered in a traditional online packet based network environment such as the Internet, the initiating computer must have knowledge of the IP address (and possibly, a port) that has been opened on the listening computer to receive IM communications. In order to provide such IP address information, an IM service will set up a log-on or registration server through which end users can record the IP address on which they are currently listening for instant messaging communications. Because all end users have access to (i.e., know the IP address of) the registration server, they are able to obtain the IP addresses of other end users who have also logged-on or registered on the server and thereby initiate IM sessions directly with another end user's computer. Alternatively, the log-on or registration server may serve as a forwarding agent between the two end users engaged in an instant messaging session.

Figure 2:
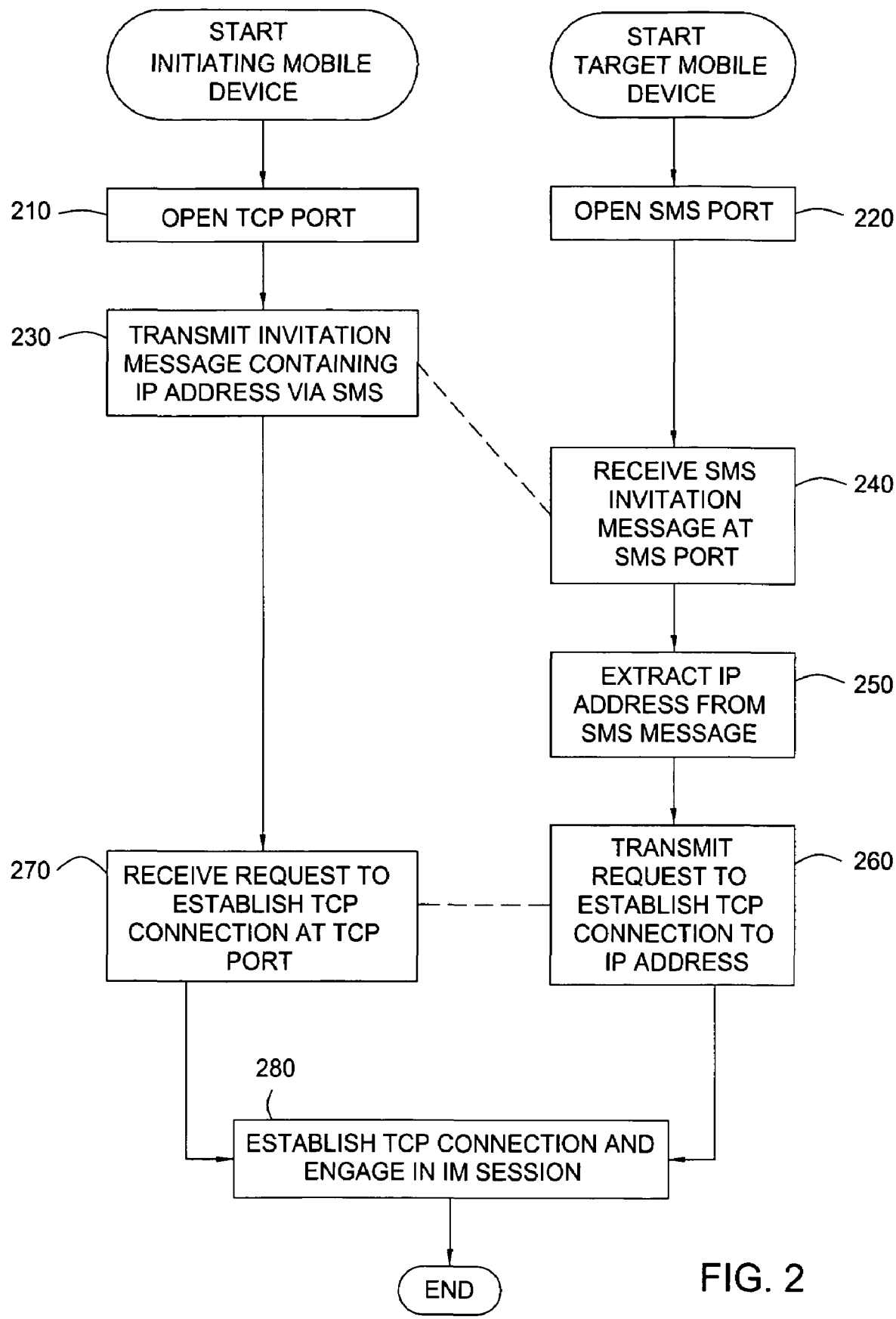
FIG. 2 depicts a flow chart for establishing a peer-to-peer session-based IM system in accordance with the present invention.

In contrast, in accordance with the present invention, a log-on or registration server for IM or presence purposes can be eliminated on a mobile network environment such as that depicted on FIG. 1. Through the use of a page-mode messaging service, such as SMS, which transmits messages to mobile devices based upon their telephone numbers, an initiating mobile device can transmit its IP address (and a listening port) in an invitation message to a target mobile device through the target device's telephone number. Once the target device receives the invitation message, it is able to contact the initiating mobile device through the received IP address and the two devices can establish a reliable virtual connection, such as a TCP connection, for session-based IM communications. FIG. 2 depicts a flow chart depicting the steps taken by an initiating and target mobile device to establish an IM session in accordance with the present invention. Initially, the initiating mobile device opens a TCP port to listen for communications from the target mobile device 210. The target mobile device has also similarly opened an SMS listening port to receive invitation SMS text messages at the specified SMS port 220. The initiating mobile device then transmits its IP address (and TCP port) in an invitation SMS text message to the telephone phone number and a specified SMS port of the target mobile device 230. The target mobile device receives the SMS text message containing the initiating mobile device's IP address (and TCP port) at the specified SMS port 240. The target mobile device extracts the IP address and TCP port from the SMS text message and opens its own TCP port 250. The target mobile device then transmits a request to establish a TCP connection to the initiating mobile device's IP address and TCP port 260. The initiating mobile device receives this request 270 and a TCP connection is established between the IP addresses and TCP ports of the initiating and listening mobile devices and these devices are able to engage in an IM session over a reliable virtual connection 280.

Additionally, to the extent a network service provider dynamically or otherwise allocates private IP addresses (rather than allocate public Internet IP addresses) to mobile devices through Network Address Translation ("NAT") or any other network address allocation techniques, the peer-to-peer techniques as described herein would only work within the private network of the network service provider since the private IP address allocated to a mobile device would not be properly resolved by a receiving mobile device residing on a separate network with a separate service provider. To address such a situation, as further depicted in FIG. 3, prior to initiating an IM session as previously described, the initiating mobile device may submit a special request that the service provider's Dynamic Host Configuration Protocol ("DHCP") server, Bootstrap Protocol ("BOOTP") server or any other server used by the service provider to allocate to the initiating mobile device a publicly accessible IP address (and/or publicly accessible port number) that can be contacted by a target mobile device residing on a separate network 310. The network service provider, through its DHCP server or other IP address allocation server allocates a publicly accessible IP address to the initiating mobile device 320 and the initiating mobile server utilizes this publicly accessible IP address (and/or publicly accessible port number) to establish an IM session as previously described herein and depicted in FIG. 2 with a target mobile device residing on a separate network 330. Such a publicly accessible IP address could be temporarily leased or allocated to the initiating mobile device until the IM session established between the initiating and target mobile devices terminates or ends. Depending upon the intended subsequent use of the initiating mobile device, the publicly accessible IP address could be either returned to the pool of available publicly available IP addresses offered by the network service provider for IM purposes 340 or renewed by the initiating mobile device, in the event, for example, that the initiating mobile device intends to initiate another IM session. Those skilled in the art will recognize that in order to implement the allocation of temporary publicly accessible IP addresses to mobile devices, as described herein, a network service provider may need to modify its network infrastructure and server features to ensure that any NAT, DHCP, firewall, security or other network management or administration technologies shall work cooperatively in order to provide such allocation of publicly accessible IP addresses.

In an alternative embodiment, rather than modify a service provider's network infrastructure in order to provide communication across different network service providers, an unrelated third party may also allocate publicly accessible IP addresses (and/or port numbers) to mobile devices to establish IM sessions between mobile devices on different service provider networks by providing one or more "redirector" servers. As further depicted in FIG. 4, in such an embodiment, an initiating mobile device contacts and establishes a TCP/IP connection with a "redirector" server in order to request a publicly accessible IP address (and/or port number) 410. Such a redirector server can be provided by any third party and those skilled in the art will recognize that in order to contact the redirector server and establish a TCP/IP connection, the initiating mobile device must already have the IP address of the redirector server (i.e., obtained through an offline process). Upon request by the initiating mobile device, the redirector server transmits to the initiating mobile device an IP address and/or port number that is mapped to the redirector server itself 420. The redirector server also opens a listening port on that specific IP address and/or port number in preparation for receiving connections from any target mobile devices that receive IM invitation messages from the initiating mobile device 430. When an initiating mobile device transmits its IP address (and TCP port) in an invitation SMS text message to the telephone phone number and a specified SMS port of the target mobile device as previously described, the actual IP address (and TCP port) transmitted shall be the IP address and TCP port received by the initiating mobile device from the redirector server (refer to FIG. 2, 230). The target mobile device receives the SMS text message containing the initiating mobile device's IP address (and TCP port) at the specified SMS port (refer to FIG. 2, 240). The target mobile device extracts the IP address and TCP port from the SMS text message and opens its own TCP port (refer to FIG. 2, 250). The target mobile device then transmits a request to establish a TCP connection to the IP address and TCP port at the redirector server 440. The redirector server receives the request from the target mobile device, establishes a TCP/IP connection with the target mobile device and informs the initiating mobile device through the TCP/IP connection established with the initiating mobile device that the target mobile device has replied to the invitation message. Thereafter, the redirector server serves as an intermediary router for all communication between the target mobile device and initiating mobile device.

While the foregoing detailed description has described the present invention using SMS, GSM, GPRS and TCP/IP, other similar services and protocols may be used in a variety of similar environments in which the present invention may be implemented. For example and without limitation, rather than using SMS to transmit an IP address (and port) from the initiating mobile device to the listening mobile device through the devices' telephone numbers, an alternative embodiment of the present invention might use a PIN-to-PIN messaging technology (as, for example, offered in RIM's Blackberry handheld devices) to transmit the IP address (and port) through unique PIN numbers associated with the mobile devices, or an alternative paging protocol using telephone numbers. Similarly, while IM sessions have been used as the primary example for describing the allocation of IP addresses, the techniques can be applied to any type of data transfer between mobile devices using a TCP/IP connection or other virtual connection, consistent with the teachings of U.S. patent application Ser. No. 11/042,620, filed Jan. 24, 2005, as incorporated herein, and with any type of network address. Furthermore, the present invention contemplates that the actual protocol used during an established IM session may also vary depending upon the preference of the implementation. For example and without limitation, Message Session Relay Protocol (MSRP) or any proprietary based protocol may be used during the IM session that is established in accordance with the present invention. Thus, various modifications, additions and substitutions and the like can be made without departing from the spirit of the invention and these are therefore considered to be within the scope of the invention as defined in the following claims.

What is claimed is:

1. A method for allocating a publicly accessible network address to an initiating mobile device in order to establish peer-to-peer session-based data transfer between the initiating mobile device and a target mobile device residing on a network other than the network of the initiating mobile device, the method comprising:
   receiving a request from the initiating mobile device to open a public network connection accessible outside the network of the initiating mobile device;
   allocating a temporary publicly accessible network address to the initiating mobile device, whereby such temporary publicly accessible network address is transmitted by the initiating mobile device in an invitation message to the target mobile device through a page-mode messaging service, wherein the target mobile device is located by providing to the page-mode messaging service a unique identification number that is used to locate the target mobile device; and
   upon completion of a data transfer session between the initiating mobile device and the target mobile device, returning the temporary publicly accessible network address to a pool of publicly available addresses.

2. The method of claim 1, wherein the network of the initiating mobile device utilizes an internal network address technique to allocate private network addresses to devices within the network.

3. The method of claim 1, the temporary publicly accessible network address is a publicly accessible IP (Internet Protocol) address.

4. The method of claim 1, wherein the page-mode messaging service is SMS (Short Message Service).

5. The method of claim 1, further comprising the steps of:
   opening a listening software port corresponding to the temporary publicly accessible network address; and
   routing data communications between the initiating mobile device and the target mobile device through the temporary publicly accessible network address.

6. A server enabled to allocate a publicly accessible network address to an initiating mobile device in order to establish peer-to-peer session-based data transfer between the initiating mobile device and a target mobile device residing on a network other than the network of the initiating mobile device, the server comprising a processor to: receive a request from the initiating mobile device to open a public network connection accessible outside the network of the initiating mobile device; allocate a temporary publicly accessible network address to the initiating mobile device, whereby such temporary publicly accessible network address is transmitted by the initiating mobile device in invitation message to the target mobile device through a page-mode message service, wherein the target mobile device is located by providing to the page-mode messaging service a unique identification number that is used to locate the target mobile device; message containing the address and a listening port of the initiating mobile device; and reclaim the allocated temporary publicly accessible network address from the initiating mobile device upon completion of a peer-to-peer session-based data transfer between the initiating mobile device and the target mobile device.

7. The server of claim 6, wherein the network of the initiating mobile device utilizes an internal network address technique to allocate private network addresses to devices within the network.

8. The server of claim 6, wherein the temporary publicly accessible network address is a publicly accessible IP (Internet Protocol) address.

9. The server of claim 6, wherein the page-mode messaging service is SMS (Short Message Service).

10. The server of claim 6, further programmed to:
   open a listening software port corresponding to the temporary publicly accessible network address; and
   route data communications between the initiating mobile device and the target mobile device through the temporary publicly accessible network address.

* * * * *

UNITED STATES PATENT AND TRADEMARK OFFICE
CERTIFICATE OF CORRECTION

| | | |
|---|---|---|
| PATENT NO. | : 7,502,335 B2 | |
| APPLICATION NO. | : 11/182927 | |
| DATED | : March 10, 2009 | |
| INVENTOR(S) | : Daniel J. Lin | |

Figure 3:
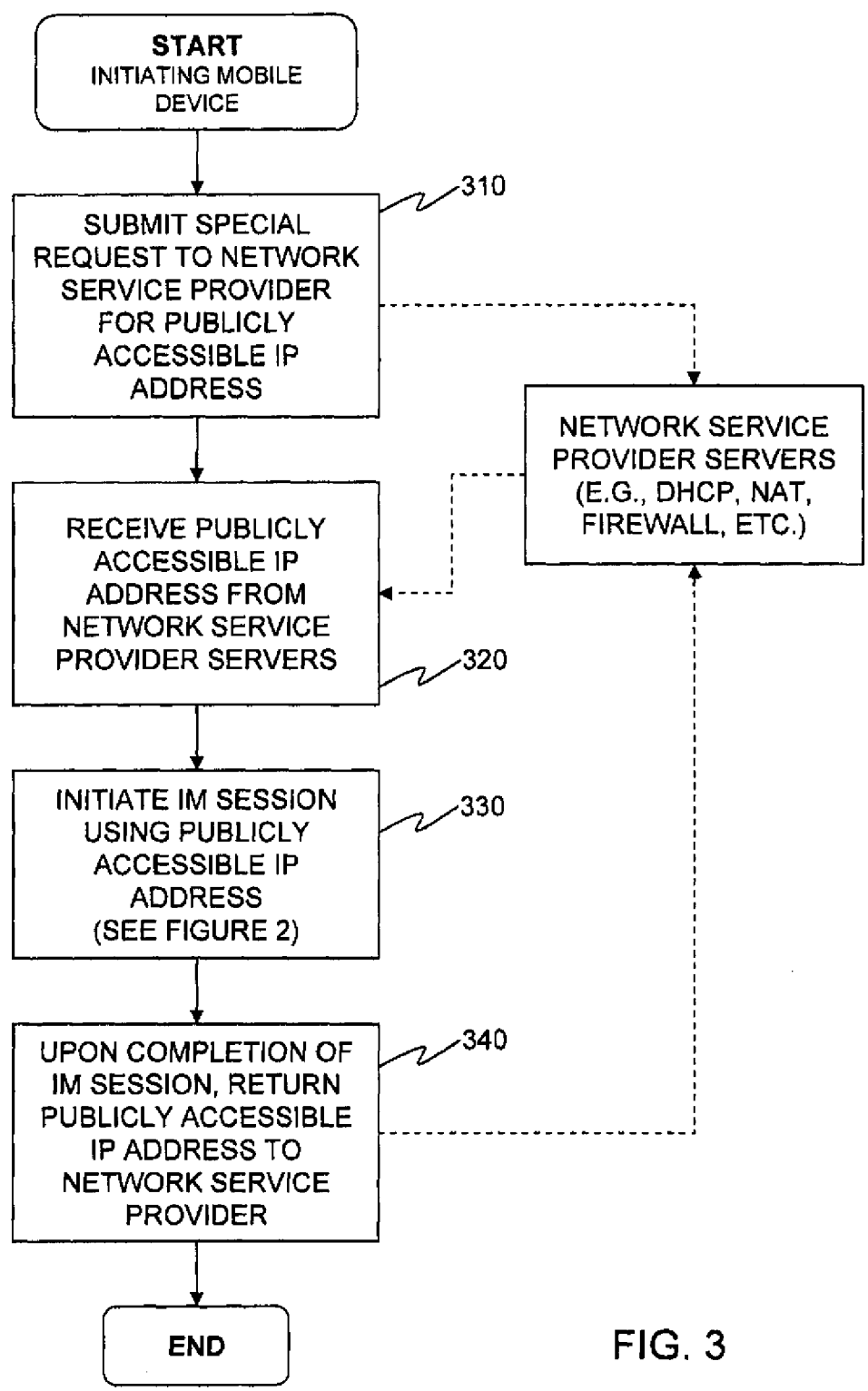
FIG. 3 depicts a flow chart for allocating publicly accessible IP addresses to initiating mobile devices to facilitate peer-to-peer IM sessions between mobile devices on separate networks.
Figure 4:
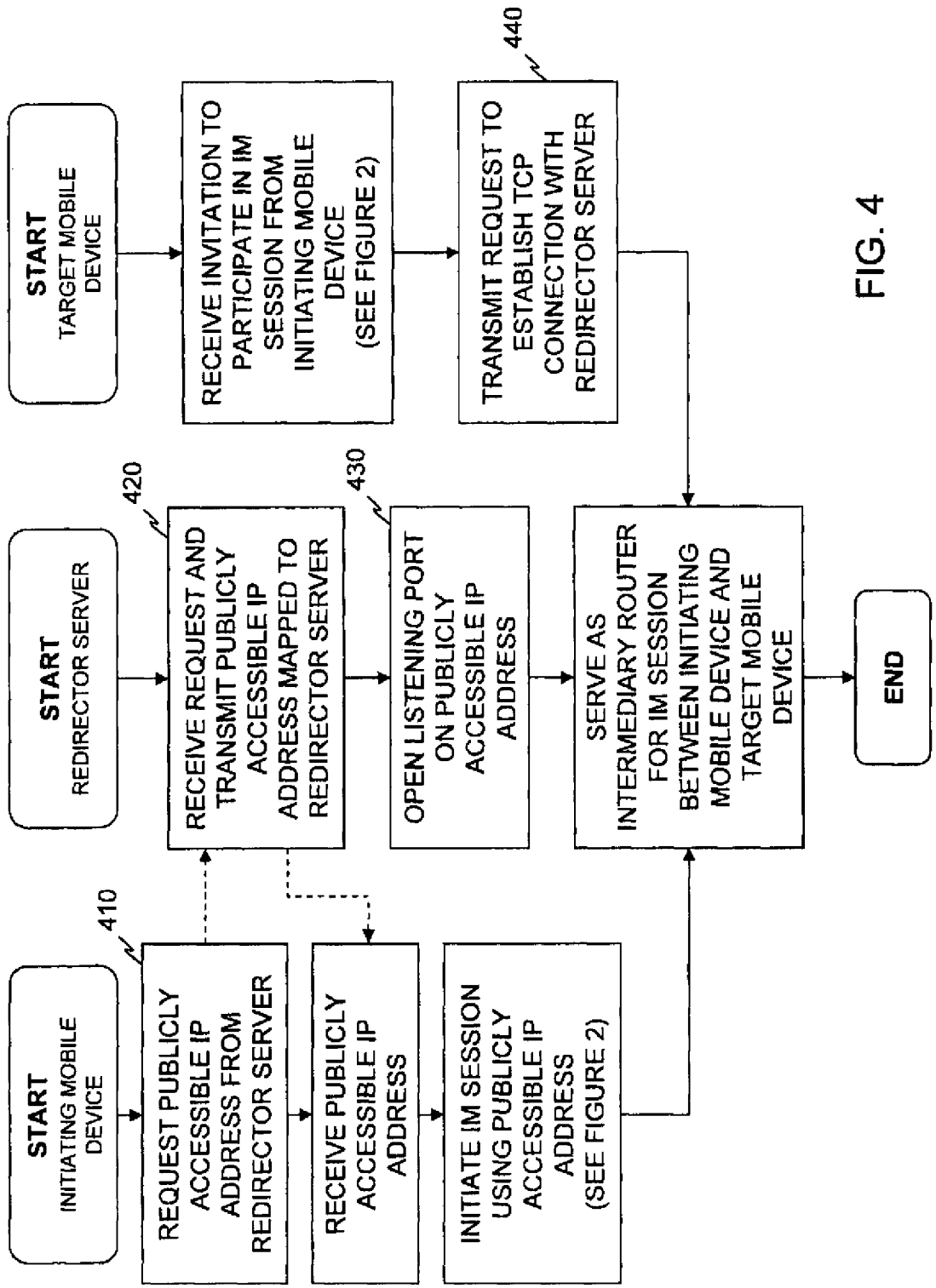
FIG. 4 depicts a flow chart for allocating publicly accessible IP addresses to initiating mobile devices to facilitate IM sessions between mobile devices on separate networks using a redirector server.

It is certified that error appears in the above-identified patent and that said Letters Patent is hereby corrected as shown below:

Delete drawing sheet 3 and 4, and substitute the attached sheets containing figures 3 and 4 therefor.

Signed and Sealed this

Ninth Day of June, 2009

JOHN DOLL
*Acting Director of the United States Patent and Trademark Office*